United States Patent [19]

Roque

[11] 4,345,652
[45] Aug. 24, 1982

[54] PROCESS FOR IMPROVING THE PERMEABILITY OF GROUND FORMATIONS, ADAPTED TO THE PRODUCTION OF HIGH TEMPERATURE GEOTHERMIC ENERGY

[75] Inventor: Claude Roque, Chatou, France

[73] Assignee: Institut Francais du Petrole, Rueil-Malmaison, France

[21] Appl. No.: 219,606

[22] Filed: Dec. 24, 1980

[30] Foreign Application Priority Data

Dec. 28, 1979 [FR] France .................. 79 32020

[51] Int. Cl.³ .................. E21B 43/27; E21B 43/28
[52] U.S. Cl. .................. 166/307; 60/641.3; 166/271; 166/273; 166/302; 299/4
[58] Field of Search .......... 166/247, 271, 272, 273, 166/299, 302, 307; 299/4, 5; 60/641.3, 641.4; 165/45

[56] References Cited

U.S. PATENT DOCUMENTS

| | | |
|---|---|---|
| 2,679,294 | 5/1954 | Bond et al. .................. 166/307 X |
| 3,086,760 | 4/1963 | Bays .................. 299/4 |
| 3,184,297 | 5/1965 | Gancy .................. 299/5 X |
| 3,348,883 | 10/1967 | Jacoby et al. .................. 299/4 |
| 3,529,669 | 9/1970 | Tietz .................. 166/307 |
| 3,661,424 | 5/1972 | Jacoby .................. 299/4 |
| 3,676,078 | 7/1972 | Jacoby .................. 299/5 X |
| 3,786,858 | 1/1974 | Potter et al. .................. 166/247 X |
| 3,817,038 | 6/1974 | Paull et al. .................. 60/641.2 |
| 3,864,917 | 2/1975 | Jacoby .................. 166/302 X |
| 3,917,345 | 11/1975 | Davidson et al. .................. 166/307 X |
| 4,223,729 | 9/1980 | Foster .................. 166/271 |

*Primary Examiner*—Stephen J. Novosad
*Assistant Examiner*—George A. Suchfield
*Attorney, Agent, or Firm*—Millen & White

[57] ABSTRACT

This process comprises the three successive following steps of:

(a) injecting into a formation a solution of sodium or potassium hydroxide during a limited time interval to perform a chemical leaching treatment of the formation;

(b) injecting a saline solution, and (c) establishing a circulation of a heat conveying fluid through the formation.

9 Claims, 7 Drawing Figures

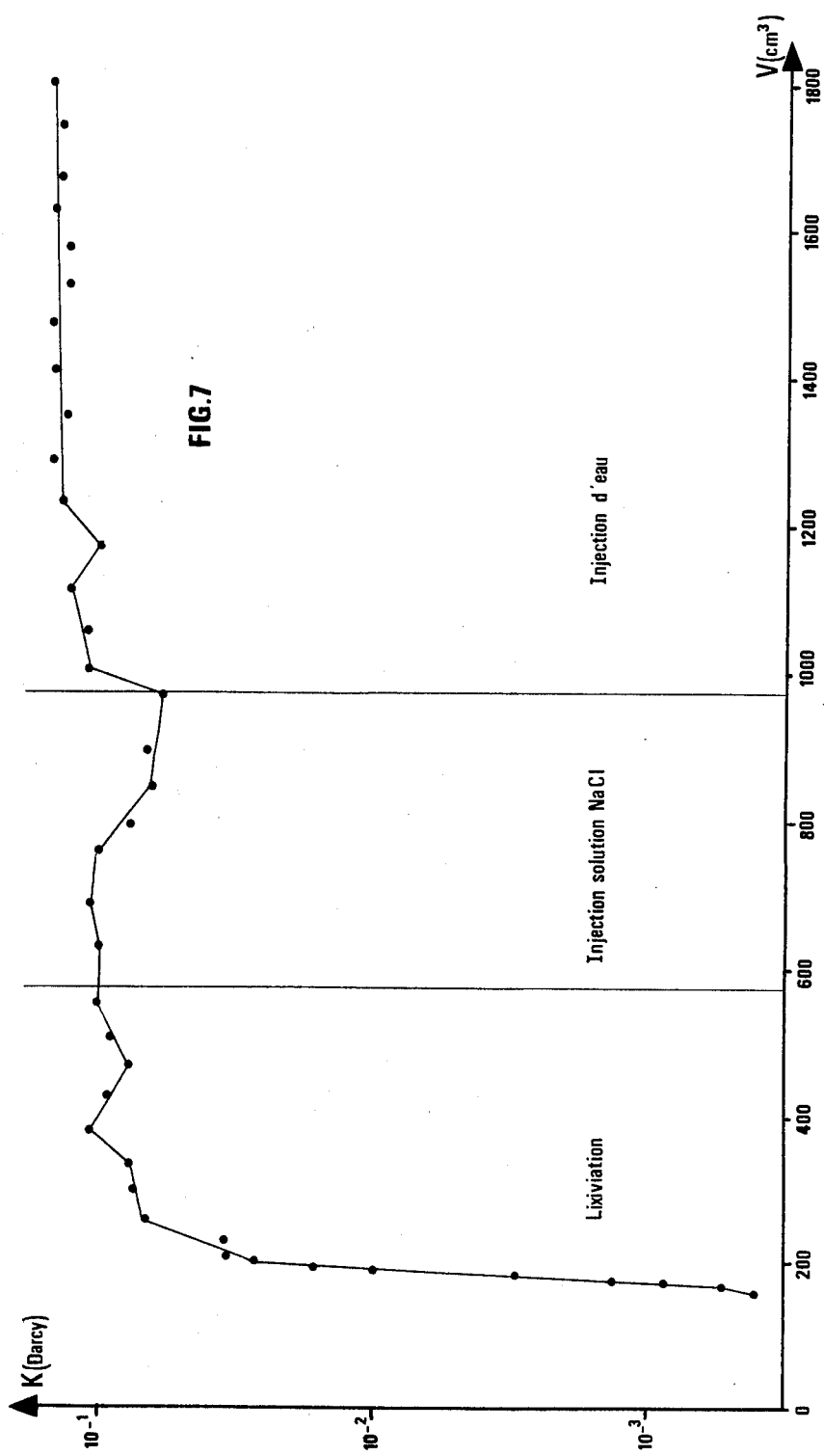

PROCESS FOR IMPROVING THE PERMEABILITY OF GROUND FORMATIONS, ADAPTED TO THE PRODUCTION OF HIGH TEMPERATURE GEOTHERMIC ENERGY

BACKGROUND OF THE INVENTION

The present invention relates to a process for improving the permeability of ground formations, which is particularly adapted to the production of high temperature geothermal energy, i.e. when the temperature of the heat conveying fluid reaches or exceeds 200° C.

Two modes of production of high temperature geothermal energy may be distinguished.

The first mode uses natural production of a hot fluid, which limits the application of the process only to favourable sites.

In the second mode, called dry-geothermy, there is recovered the sensible heat from rocks located at great depth, and which do not naturally produce fluid at an industrially attractive flow rate.

Heat recovery can then be effected by injecting a cold fluid into a well, this fluid flowing through the hot rock, being heated by contact with this rock and raised up to the ground surface where it is delivered through another well.

However this mode of energy production depends on the permeability of the rocks through which the heat conveying fluid is circulated and unfortunately the rock permeability is poor at great depths.

This permeability can be increased by widening the naturally existing fractures of the ground formations, or fractures by creating in these formations and widening them, or by increasing the permeability of the rock matrix, this permeability increase resulting from the penetration of the fracturing fluid into micro-cracks of the walls of a fracture.

SUMMARY OF THE INVENTION

The invention provides an improved process for achieving the following two goals.
1. increasing the yield and injectability of the heat-conveying fluid by increasing the rock permeability in the vicinity of the injection well; and
2. increasing conductivity of the fracture by increasing the overall permeability and the width of these fractures.

The conductivity of a fracture is a parameter expressed as the product of the permeability (generally measured in Darcy) by the width of the fracture (usually measured in meters).

The yield of a well may be defined as the ratio $$Q_o/(P_s - P_d),$$

where $Q_o$ is the volumetric oil flow rate in m$^3$/day at the storage location (standard temperature and pressure conditions). $P_s$ is the "static" pressure, i.e. the pressure (measured in bars) of the geothermal deposit at the minimum draining flow rate of the closed well. $P_d$ is the pressure at the hole bottom when the flow rate of the well is $Q_o$. Injectability may be defined as the ratio $$Q_o/(P_d - P_s),$$

since in this case $P_d > P_s$.

Generally speaking, the process according to the invention which is carried out in a zone of hot geological formations, or rocks, comprises the following three steps:

1. Chemical leaching treatment of the rock by injecting a hydro-alcoholic solution of sodium hydroxide or potassium hydroxide,
2. Injection of a saline solution, and
3. Establishing a circulation of heat-conveying fluid through the formation.

The leaching treatment of the formation may be effected by using, for example, a hydro-alcoholic solution of sodium hydroxide containing from 1 to 30 percent by weight of NaOH, more particularly from 2% to 10% by weight. There can be used, for example, an aqueous solution of sodium hydroxide in ethanol having an ethanol content comprised between 5% and 50% by volume, and in particular lower than 25% by volume. It will be also possible to use a solution of potassium hydroxide containing from 5 to 30 percent by weight of KOH.

BRIEF DESCRIPTION OF THE DRAWINGS

FIG. 7 shows the variation of the permeability of a rock sample into which are successively injected a sodium hydroxide solution, a saline solution and water.

DETAILED DISCUSSION OF THE INVENTION

Figure 1:
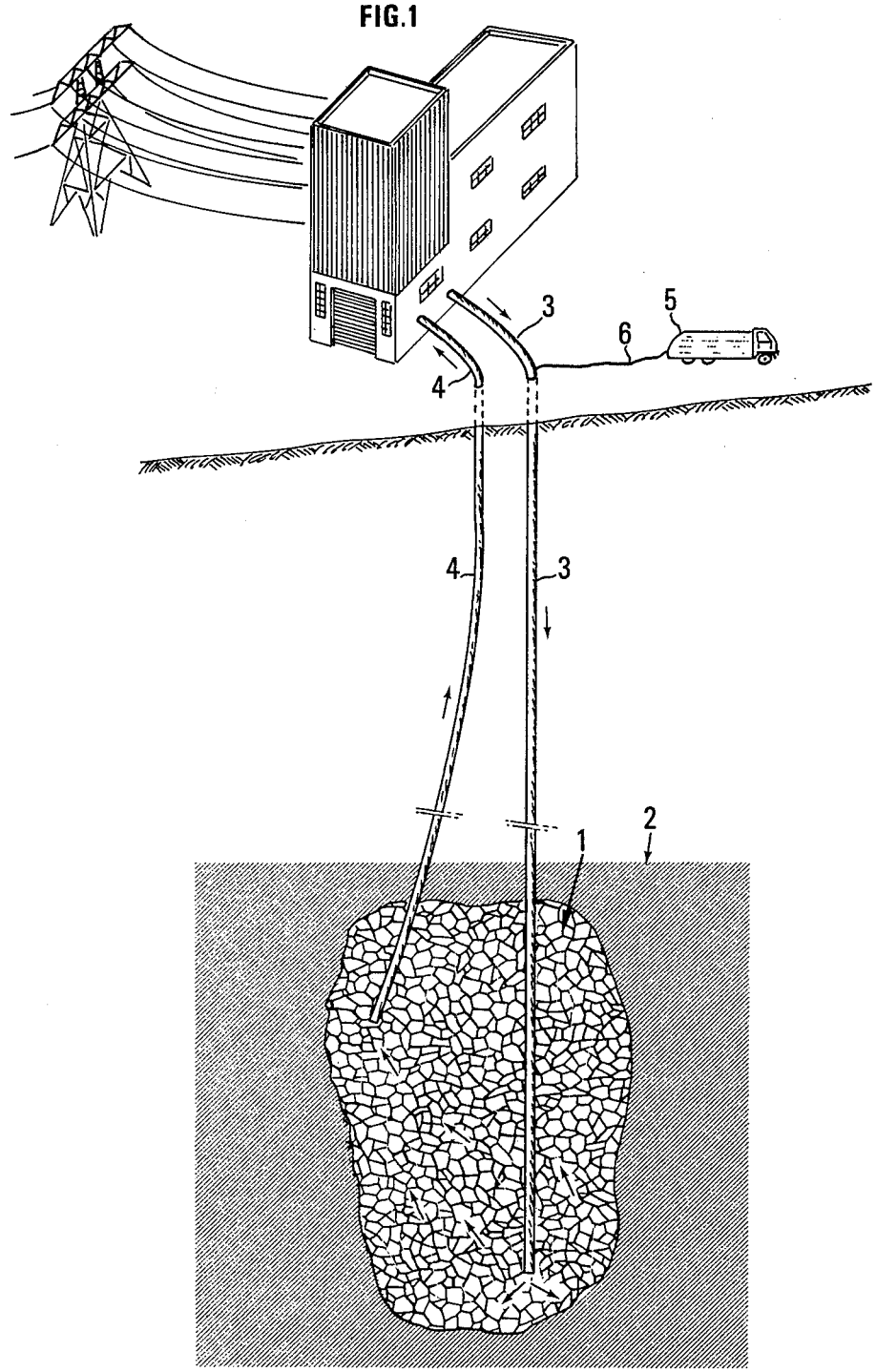
FIG. 1 is a diagrammatic illustration of the process for geothermal energy production according to the invention.

Reference is first made to FIG. 1 which shows a fracture 1 formed in a hot cristalline rock 2 located at a great depth.

This fracture is, for example, created by hydraulic fracturing, by injecting water under pressure into the well 3, or by using a leaching fluid constituted by a hydro-alcoholic solution of sodium or potassium hydroxide.

The following successive steps are then carried out:

1. Chemical leaching treatment of the fracture

If the fracture has been produced by means of the above-defined leaching fluid, the latter is maintained under pressure within the fracture or, advantageously, a circulation of this solution of sodium or potassium hydroxide is established between the well 3 and another well 4 which opens in the fracture 1.

If the fracture 1 has been created by injecting water under pressure, the chemical leaching treatment of the formation is effected after the step of hydraulic fracturing by substituting for the water a hydro-alcoholic solution of sodium or potassium hydroxide.

This can be advantageously achieved by creating a liquid flow circulation between the wells 3 and 4.

2. Injection of a saline solution

When the preceding step has been performed, there is effected, according to the invention, a step of chemical stabilization of the rock by substituting for the hydro-alcoholic solution of sodium or potassium hydroxide, used in the preceding step, an aqueous saline solution such as a solution of sodium or potassium chloride containing from 2 to 30 grams of sodium chloride per liter, for example 10 g/l of sodium chloride.

The effect of this stabilization step is to maintain the permeability of the formation by stopping the dissolution of the reaction products resulting from the preceding lixiviation step.

Under these conditions, subsequent injection of water used as heat-conveying fluid during the following step will not dissolve any material from the rock and the previously produced permeability will no longer vary.

The chemical products successively injected during the above steps 1 and 2 can be introduced into the well 3 from a processing van 5, through a pipe 6 as is illustrated in Figure 1.

3. Creating a circulation of a heat conveying fluid

When the two above-defined steps have been performed, water is circulated between the well 3 (injection well) and the well 4 (production well) in a closed loop, in a manner known to those skilled in the art, with the water injected through the well 3 being heated upon the contact with the geological formation 2.

Heat energy contained in the water or steam rising up through the well 4 is collected in an electric power plant 7 which may be of any suitable type, then the water is re-injected into the well 3, thereby forming a geothermal energy exploitation loop.

The above-defined steps are discussed below in greater detail.

I. CHEMICAL LEACHING TREATMENT OF THE ROCK

A solution of sodium or potassium hydroxide is caused to react with the geological formations during a limited period.

Permeability can be highly increased by using a hydro-alcoholic solution of sodium or potassium hydroxide.

Particularly outstanding results are achieved by using a hydro-alcoholic sodium solution having an NaOH content comprised between 1 and 30 percent by weight, more particularly 10% by weight, especially in the case of granodiorites.

The alcohol will be, for example, ethanol used at a concentration from 5 to 50% by volume of ethanol in the solution. This concentration (which depends on the concentration of the sodium hydroxide solution) will advantageously be of about 20% in the case of granodiorites.

Other alcohols may be used, for example, methanol, isopropanol, etc...

The contact time of the solution with the treated formation will be selected to be sufficient to increase the rock permeability without deteriorating the rock, this increase being detected by continuously measuring at the ground surface the pressure drop of the solution injected into the geological formation.

The following comparative tests show the efficiency of the leaching test:

First Series of Tests: Chemical Attack on the Rock by Solutions of Sodium Hydroxide, in Cells, Without Fluid Circulation The attack was performed on a cylindrical volume of 2 cm$^3$ of rock placed in 200 cm$^3$ of reacting solution.

The operating mode comprised the following sequence:

measurement of the permeability of the sample with respect to water at the beginning of the test;

weighing of the water-saturated sample;

chemical reaction at 100° C. under 100 bars, i.e. under the average conditions of a subterranean deposit (duration: 1 to 6 days);

slow cooling;

rinsing with distilled water;

measurement of the permeability to water at the end of the test;

weighing of the water-saturated rock.

TABLE I

Rock in their natural state; temperature of the tests 100° C.; pressure: 100 bars; duration of the tests: 144 hour.

| KIND OF ROCKS | GRANODIORITE OF PORS-PODER* | GNEISS OF PLANES* | GRANITE OF PEN AR CREACH* | QUARTZITE OF TIGNES* |
|---|---|---|---|---|
| Silica content of the rock | 25% | 32% | 40% | 82% |
| Initial permeability (DARCY) | $10^{-6}$ | $10^{-6}$ | $3 \times 10^{-7}$ | $4 \times 10^{-5}$ |
| (A) Solute = NaOH 10% by weight — Solvent = water | | | | |
| Permeability at the end of the test | $5 \times 10^{-3}$ | $1.4 \times 10^{-4}$ | $5 \times 10^{-3}$ | Complete disaggregation of the rock |
| Weight loss | 4% | 5% | 17% | Not measurable |
| (B) Solute = NaOH 10% by weight — Solvent:water 50% + ethanol 50% by volume | | | | |
| Permeability at the end of the test | Disaggregation of the rock | $1.7 \times 10^{-3}$ | Disaggregation of the rock | Complete disaggregation of the rock |
| Weight loss | 10% | 6% | 26% | Not measurable |

*(FRANCE)

The results of this first series of tests appear in Table I.

Table I shows the increase in the rock permeability which can be obtained by using a solution of sodium hydroxide, but also the remarkable permeability increase obtained by using a hydro-alcoholic solution of sodium hydroxide instead of a solution of sodium hydroxide containing no alcohol.

Second Series of Tests: Leaching Tests (Continous Fluid Circulation)

A second series of tests was performed by continuously circulating, at a rate of 100 cm$^3$/hour, hydro-alcoholic solutions of sodium hydroxide through a cylindrical core of granodiorite from Pors-Poder (core diameter 25 mm, core length 43 mm) comprising an axial fracture and placed under the conditions prevailing in a geothermal deposit (temperature 200° C., confining pressure 170 bars).

A solution of 2% by volume NaOH and 20% by volume ethanol (Solution 1) and a solution of 10% NaOH and 20% ethanol (Solution 2) were successively used.

These solutions were injected into the fracture under a pressure of 150 bars.

Figure 2:
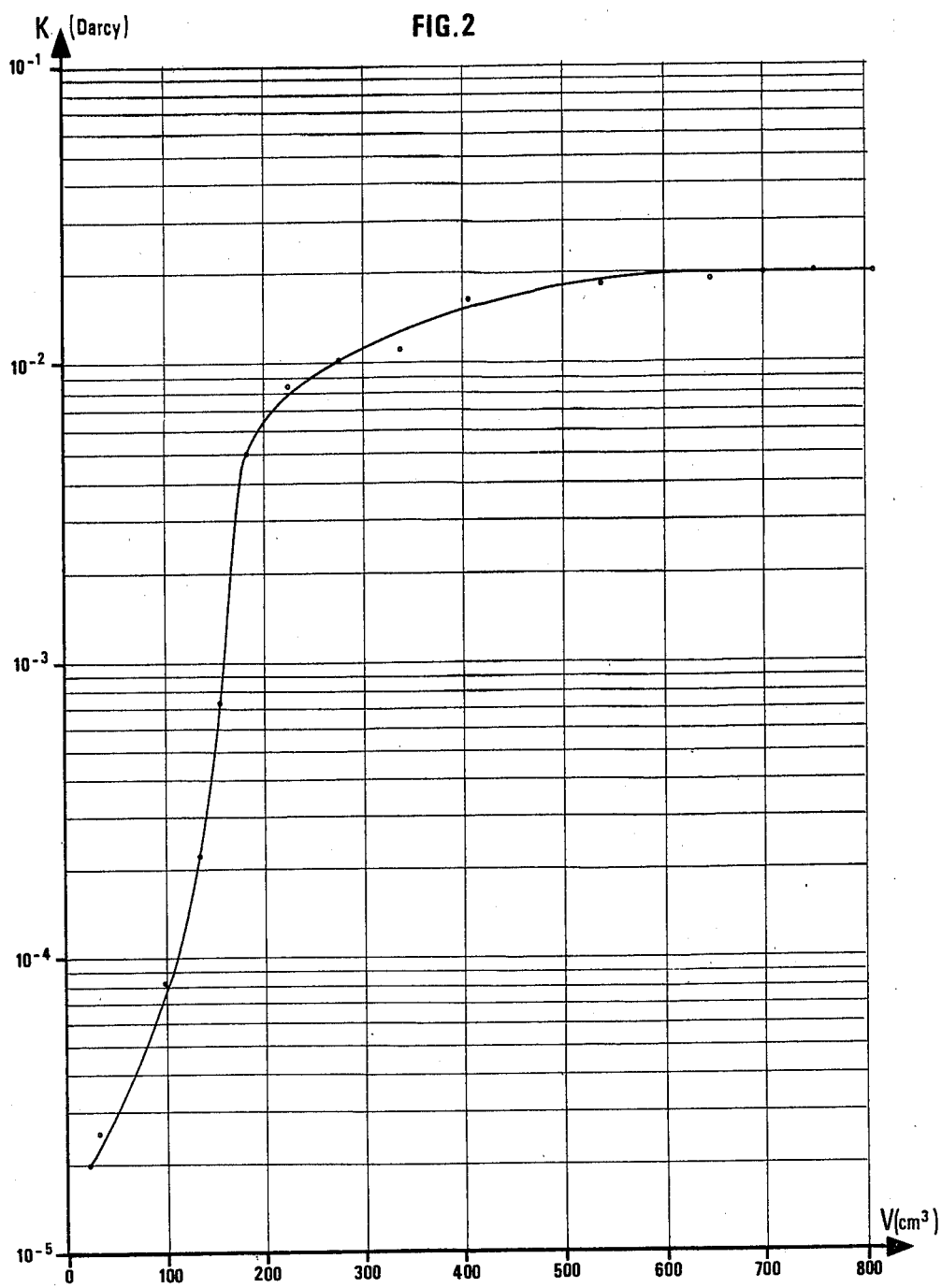
Fig. 2 is a graph illustrating the variation in fracture permeability of a rock sample in relation to the volume of the injected hydro-alcoholic solution of sodium hydroxide.
Figure 3:
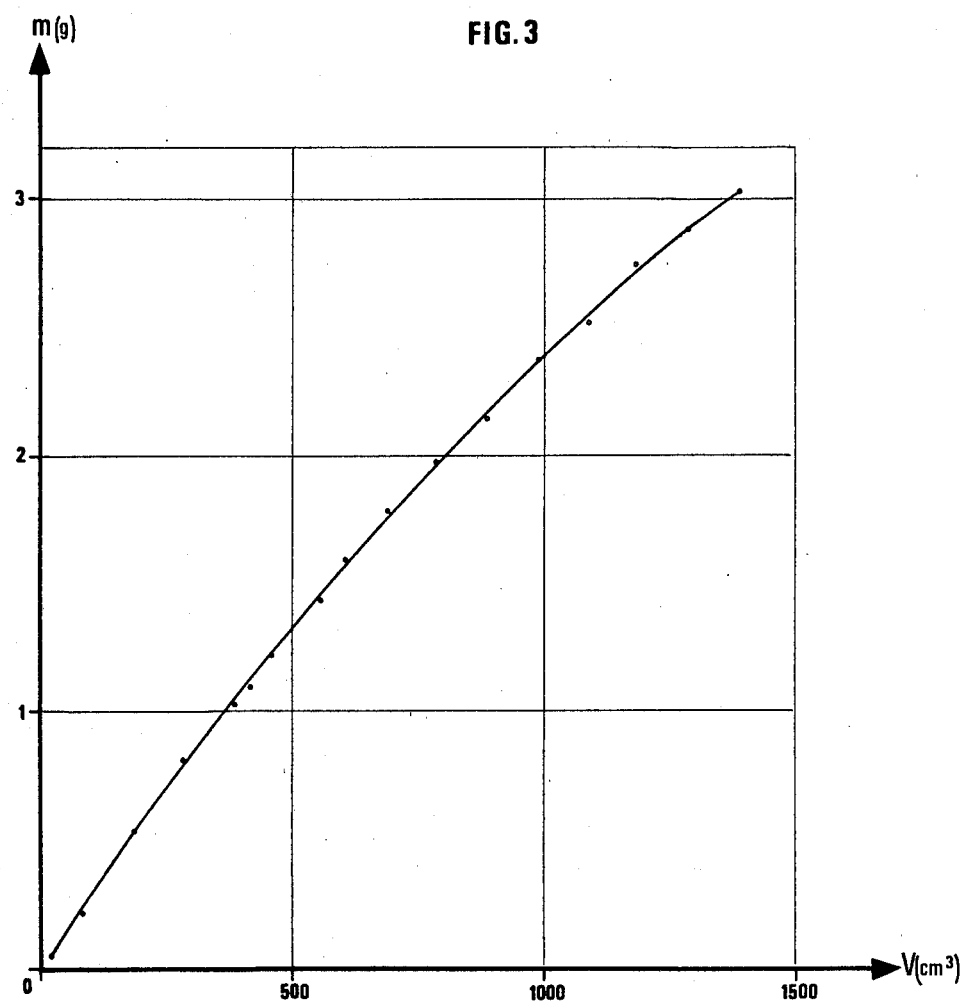
FIG. 3 is a graph showing the evolution of the dissolved mass of silica, in relation to the volume of injected hydro-alcoholic solution of sodium hydroxide during the same test.
Figure 4:
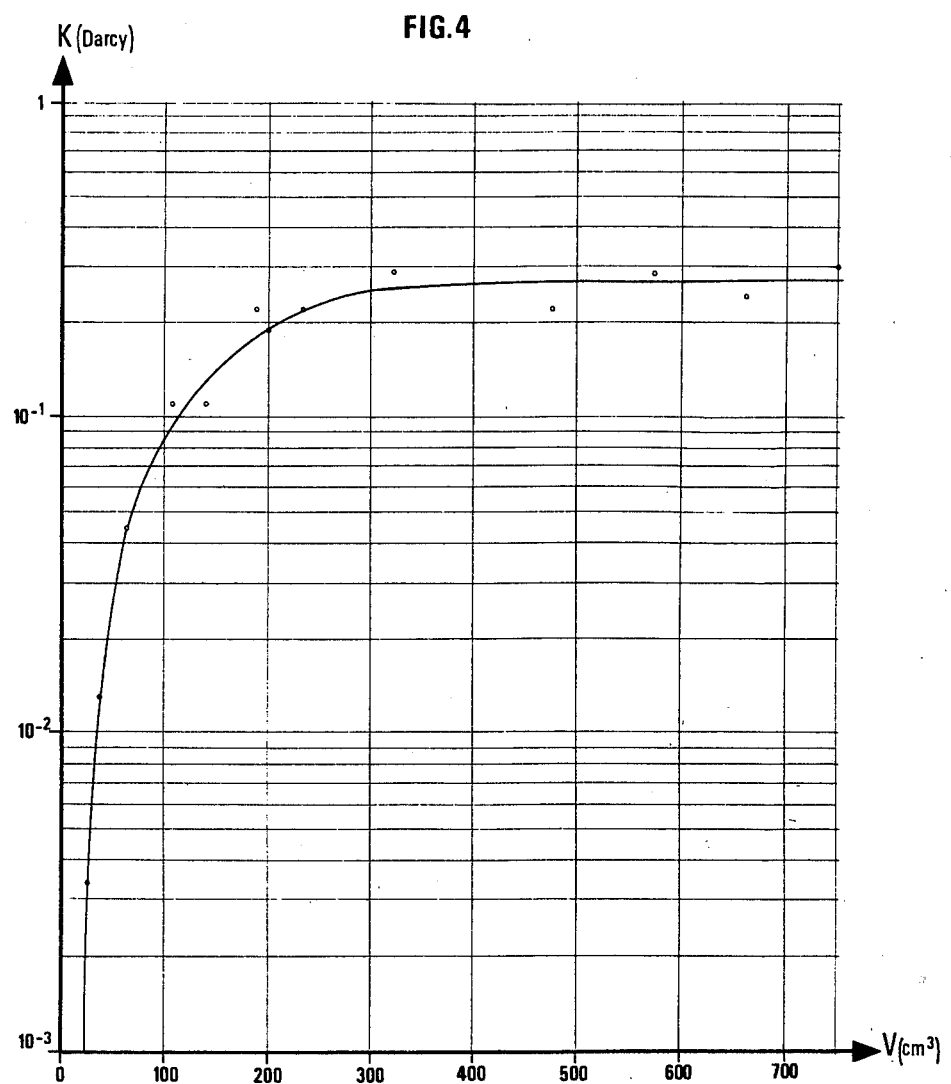
FIG. 4 is a graph illustrating for another hydro-alcoholic solution of sodium hydroxide, the variation in the fracture permeability of a rock sample, in relation to the volume of the injected solution.

The results of this second series of tests are diagrammatically shown in the accompanying FIGS. 2, 3, and 4.

In FIG. 2 concerning the solution 1, the variation in the fracture permeability K (in Darcy) of the core is plotted versus the volume V of the injected hydro-alcoholic solution of sodium hydroxide (in milliliters).

FIG. 3 shows, also for the solution 1, the mass m of silica (in grams) dissolved by the solution, in relation to the injected volume V of solution (in milliliters).

After 18 hours the weight loss of the core was higher than 5%, which is a high value.

FIG. 4 shows for the solution 2 the variation in the fracture permeability K of the core versus the volume V of the injected hydro-alcoholic solution of sodium hydroxide.

FIGS. 2 and 4 clearly show the significant gain obtained in the rock permeability. As a matter of fact, after leaching the rock with the 10% NaOH and 20% ethanol solution it was observed that the permeability increased from $10^{-5}$ Darcy to $2.6 \times 10^{-1}$ Darcy, for a $SiO_2$ activity (amount of $SiO_2$ dissolved in the solution) comprised between 20 and 30 mg per hour and $cm^2$ of fracture, corresponding to the dissolution of $2. \times 10^3$ kg of mineral material if the rock is treated with 100 $m^3$ of alcoholic solution, assuming an average dissolution rate of 20 g $SiO_2/dm^3$.

Third Series of Tests: Chemical Attack on the Rocks by Solutions of Potassium Hydroxide, Without Fluid Circulation A third series of tests was performed under the same conditions as the first series, using this time potassium hydroxide instead of sodium hydroxide.

The results of this third series of tests are reported in Table II. A comparison with Table I shows a lower activity of potassium hydroxide for the same reaction period.

However, the classification of the rocks remains unchanged as regards the weight loss of these rocks.

Improvement of the results by using an alcoholic solution is less significant than in the case of sodium hydroxide.

II. INJECTION OF A SALINE SOLUTION

It has been ascertained that when water (constituting the heat conveying fluid for geothermal exploitation) is injected into a geological formation after the above-described chemical leaching treatment, it is not possible to maintain the permeability obtained by this treatment.

Figure 5:
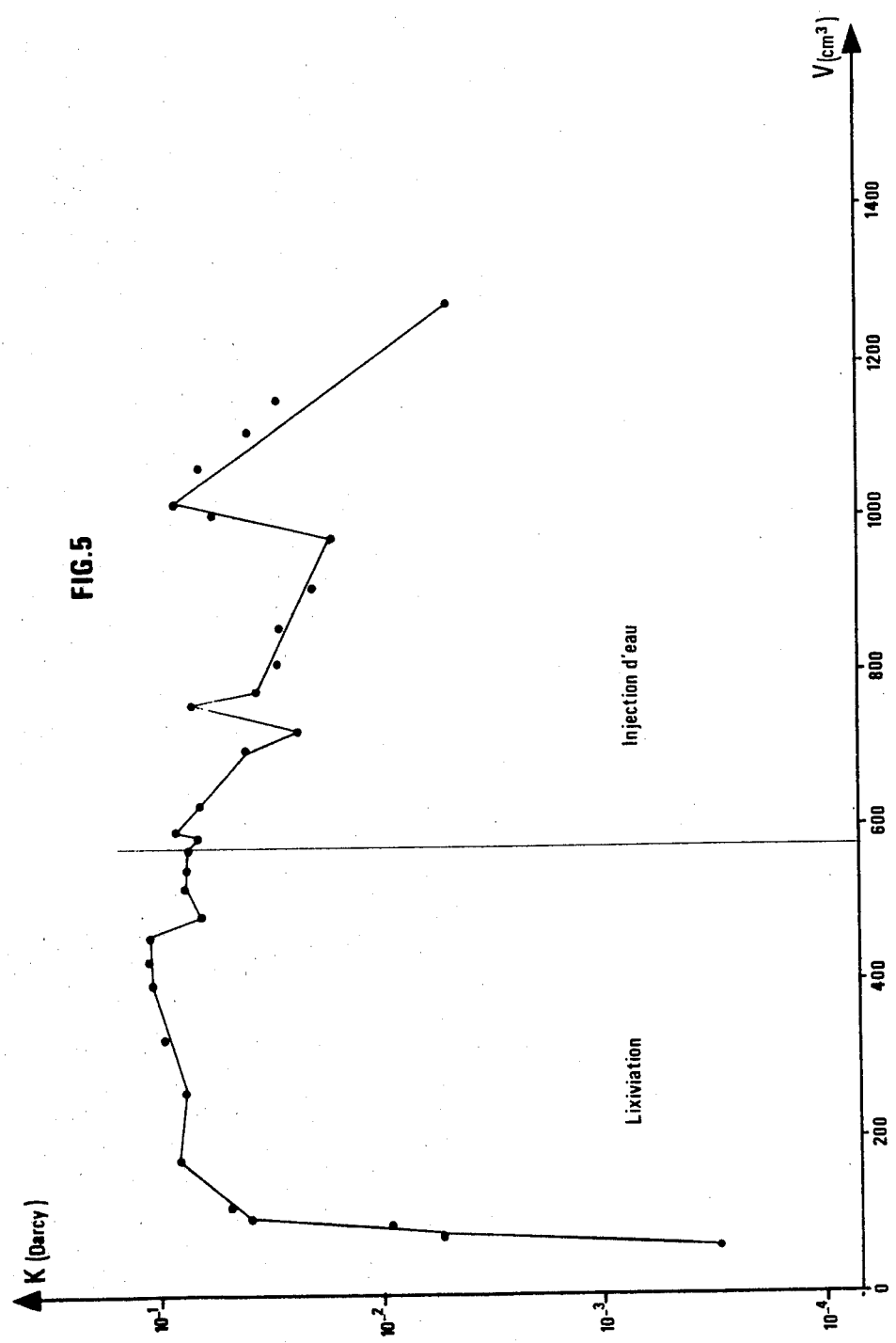
FIG. 5 represents the variation of the permeability of a rock sample into which a hydro-alcoholic solution of sodium hydroxide and water are successively injected.

As a matter of fact, from the test results shown in FIG. 5 in the ordinate axis the permeability K of the sample, in Darcy; in the abscissae the liquid volume which flowed through the sample, in $cm^3$) it appears that the permeability obtained as a result of the leaching treatment decreases when water is subsequently injected into the rock.

Figure 6:
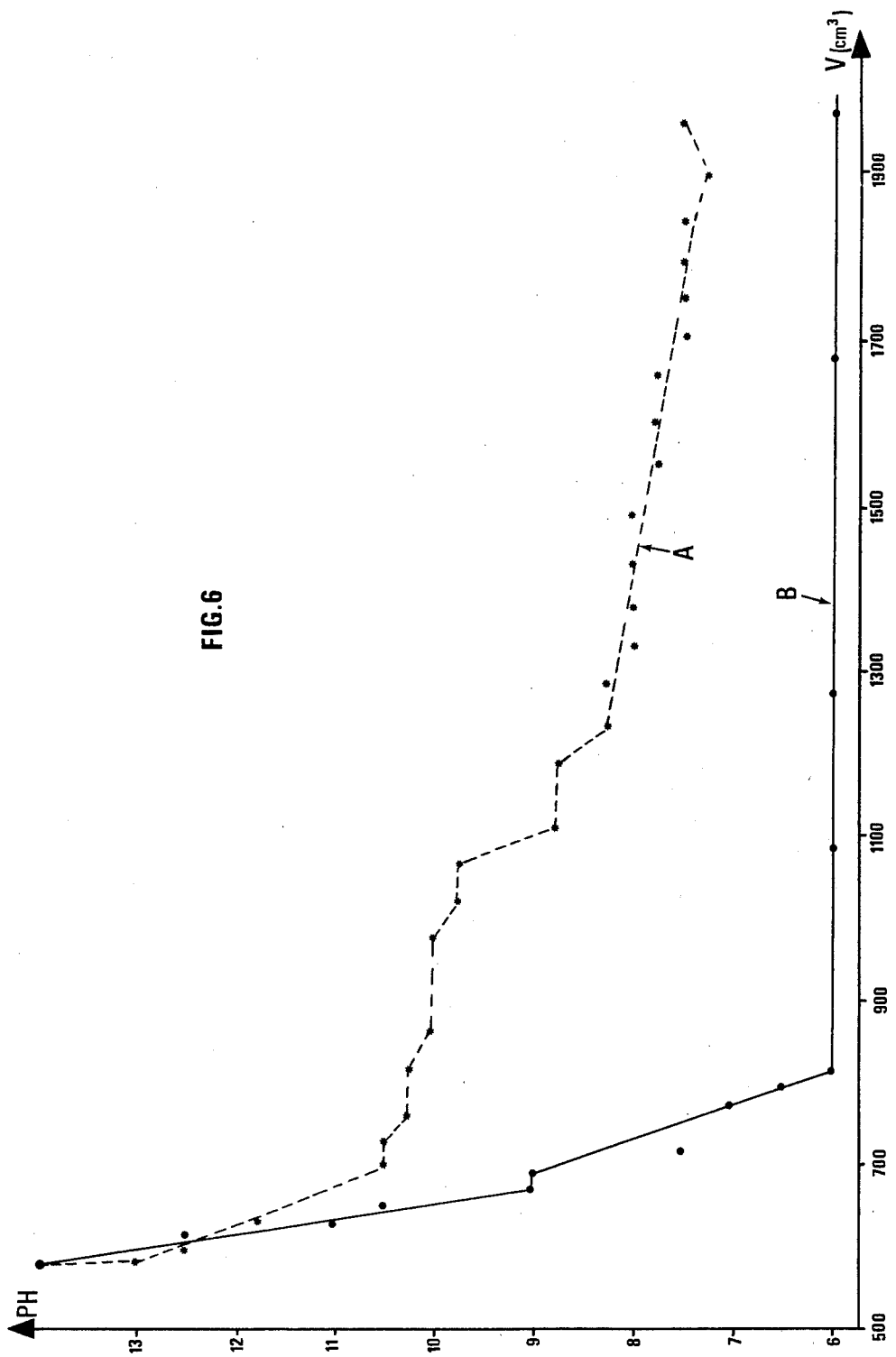
FIG. 6 shows versus time the pH evolution of two fluids flowing out from a rock sample previously subjected to a leaching treatment.

This may be explained according to curve A of FIG. 6, by the pH decrease of the water flowing out of the sample in proportion to the increased volume of injected water (indicated in the abscissae, in $cm^3$).

It may be assumed that this pH decrease causes the products resulting from the previous leaching treatment to precipitate in the pores of the rock matrix, thus reducing the permeability of this matrix.

Under such conditions it becomes very problematical to subsequently recover the permeability originally obtained as a result of the leaching treatment.

It has been discovered that it is possible to obviate this drawback by very rapidly restoring the chemical neutrality of the rock matrix, immediately after the leaching treatment thereof, thus preventing precipitation of the products of the leaching treatment.

This is obtained by injecting, after the leaching treatment, an aqueous solution of sodium or potassium chloride whose salt content may be from 2 to 30 grams/liter, for example close to 10 grams/liter.

FIG. 7, which illustrates a test wherein the leaching treatment was followed by a chemical stabilization treatment comprising the injection of a saline solution, shows that the permeability obtained as a result of the leaching treatment (permeability K indicated in the ordinate axis versus injected volumes in the abscissae, in $cm^3$) did not vary in this case.

The subsequent injection of water as heat-conveying fluid no longer dissolves material from the rock whose permeability thus remains at the desired value.

Curve B of FIG. 6 shows the very fast inversion of the matrix pH, obtained by operating under these conditions.

The three above-specified steps must be sequentially perfromed, the second step (injection of the saline solution) immediately following the chemical leaching treatment which provides the desired overall fracture permeability.

TABLE II

Rocks in their natural state; temperature of the tests: 100° C.; pressure: 100 bars; duration of the tests: 144 hours.

| KINDS OF ROCKS | GRANODIORITE OF PORS-PODER | GNEISS OF PLANES | GRANITE OF PEN AR CREACH | QUARTZITE OF TIGNES |
|---|---|---|---|---|
| Silica content of the material | 25% | 32% | 40% | 82% |
| Initial permeability (DARCY) | $10^{-6}$ | $10^{-6}$ | $3 \times 10^{-7}$ | $4 \times 10^{-5}$ |
| (A) Solute = KOH 10% by weight — Solvent:water | | | | |
| Permeability at the end of the test | $10^{-4}$ | $4 \times 10^{-6}$ | $5 \times 10^{-5}$ | $1.3 \times 10^{-3}$ |
| Weith loss | 1.5% | 1.1% | 3.5% | 16% |
| (B) Solute = KOH 10% by weight — Solvent:water 50% by volume + ethanol 50% by volume. | | | | |
| Permeability at the end of the test | $1.2 \times 10^{-4}$ | $7 \times 10^{-6}$ | $2 \times 10^{-5}$ | $1.2 \times 10^{-3}$ |
| Weight loss | 2.4% | 2% | 5.7% | 13% |

What is claimed is:

1. A process for increasing the permeability of ground formations, adapted to the production of geothermal energy at high temperature, comprising the following successive steps:
   (a) injecting a sodium or potassium hydroxide solution during a limited period to effect leaching treatment of the formation.
   (b) injecting a saline solution; and
   (c) circulating of a heat conveying fluid through the formation 2. A process according to claim 1, wherein a hydro-alcoholic solution of sodium or potassium hydroxide is used in the leaching treatment.

3. A process according to claim 2, comprising making use of a hydro-alcoholic solution of sodium hydroxide whose NaOH content is from 1 to 30 percent by weight.

4. A process according to claim 2, comprising making use of a hydro-aloholic solution of potassium hydroxide whose KOH content is from 5 to 30 percent by weight.

5. A process according to claim 2, comprising making use of a hydro-alcoholic solution of sodium hydroxide whose NaOH content is from 2 to 10 percent by weight.

6. A process according to claim 3, wherein the hydro-alcoholic solution is an aqueous solution of sodium hydroxide in ethanol, having an ethanol content from 5 to 50% by volume.

7. A process according to claim 3, wherein the hydro-alcoholic solution is an aqueous solution of sodium hydroxide in ethanol, the ethanol content of which is smaller than 25% by volume.

8. A process according to claim 1, wherein the chemical leaching treatment is followed by the injection of an aqueous solution of sodium or potassium chloride into the formation.

9. A process according to claim 8, wherein the injected solution of sodium chloride contains from 2 to 30 grams of sodium chloride per liter.

* * * * *